United States Patent [19]
Collot et al.

[11] 3,962,703
[45] June 8, 1976

[54] AIRBORNE TELEMETERING RADAR HAVING VARIABLE WIDTH RANGE GATES

[75] Inventors: Gérard Collot, Saint-Germain-en-Laye; Jean Ferreol, Palaiseau, both of France

[73] Assignee: Societe Dite: Electronique Marcel Dassault, Paris, France

[22] Filed: May 31, 1974

[21] Appl. No.: 475,026

Related U.S. Application Data

[63] Continuation-in-part of Ser. No. 260,177, June 6, 1972, abandoned.

[30] Foreign Application Priority Data
June 8, 1971  France .............................. 71.20758

[52] U.S. Cl. ............................... 343/7.3; 343/7 A
[51] Int. Cl.² .......................................... G01S 9/14
[58] Field of Search .................. 343/7 A, 7.3, 5 GC

[56] References Cited
UNITED STATES PATENTS

| | | |
|---|---|---|
| 3,495,245 | 2/1970 | Leyde .................................. 343/7.3 |
| 3,503,068 | 3/1970 | Yamauchi ........................... 343/7.3 |
| 3,564,547 | 2/1971 | Dent .................................... 343/7.3 |
| 3,648,286 | 3/1972 | Schoneborn ....................... 343/7.3 |

*Primary Examiner*—Malcolm F. Hubler
*Attorney, Agent, or Firm*—Stevens, Davis, Miller & Mosher

[57] ABSTRACT

The present invention concerns an airborne radar receiver for acquisition and tracking of a target providing two range-gates displaced during a search phase and comprising means for locking the range gates onto an echo receiver which is then tracked during a tracking phase. The receiver also comprises means for supplying a third gate accompanying the first two range gates and adjacent to the latter in the direction of the greater distances, and means for bringing all the gates back to zero when the third range gate encounters an echo the width of which is greater than a predetermined value corresponding to a target.

3 Claims, 4 Drawing Figures

AIRBORNE TELEMETERING RADAR HAVING VARIABLE WIDTH RANGE GATES

This is a continuation-in-part of copending application for Pat. Ser. No. 260,177 filed on June 6, 1972 in the name of Gerard COLLOT, now abandoned.

FIELD OF THE INVENTION

The present invention concerns airborne acquisition and tracking radar receivers.

PRIOR ART

It is known that, in airborne target acquisition and tracking radars, one, but most commonly two range gates are, during the search or acquisition phase, periodically displaced between a minimum distance and a maximum distance and, when a target echo appears, lock onto the same so as to provide, from the moment of locking, a permanent indication of the distance of the target.

During the acquisition phase however, and thus, particular when the aircraft if flying at low altitude, echos are produced which do not result from the presence of a target but which are caused by the ground and tus, with conventional radars, the information concerning a possible target are relatively very limited as to the range of target distances for which the radar is operative.

The undesirable echos are due not only to the "altitude return signal" which corresponds to the reflection of radar pulses on the surface of the ground or of the sea straight below the aircraft, but also to signals emitted by the portion of the ground encountered by the beam corresponding to the main lobe of the radar diagram when the aircraft is flying at low altitude.

The presence of the latter echos, or "ground echos," limits the target search range of such radars to a distance corresponding to that at which the beam of the main lobe approaches the ground.

SUMMARY OF THE INVENTION

The object of the invention is an improvement in radar receivers preventing them from locking onto ground echos, even if they exist, and which thus ensures the aircraft fitted with such a radar receiver with performances hitherto unattainable.

The invention is based on the observation that ground echos are generally far wider than target echos and it thus contemplated to test the echos as to their width, so that, when there is an echo the width of which exceeds a predetermined value, locking of the range gates is prohibited.

Thus, with a radar receiver according to the invention, one can be sure that the range gates only lock onto an echo when the latter originates from a target.

For comparing the energy of the target echo with the energy of ground echo, the radar receiver is provided with means for generating a third range gate, in addition to the two conventional range gates and with means enabling the energy of an echo to be measured through this third range gate.

In order to still improve the automatic operation of the radar comprising a receiver according to the invention, it is provided to control the width of said third range gate which performs two different functions in the search or acquisition phase and in the tracking phase, although it is used in both phases for measuring an echo energy.

More precisely, this third range gate is generated with a relatively large width during the search phase and is generated with a narrower width on the tracking phase. This enables, as hereinafter explained, and when the third range gate is of large width not to interrupt the search mode operation when an echo occurs the width of which corresponds to a target whereas when the echo tested by said third range gate of large width has been found important, the search with increasing ranges will be discontinued and range search will return to its zero starting point where it is automatically resumed.

DESCRIPTION OF THE PREFERRED EMBODIMENTS

Figure 1:
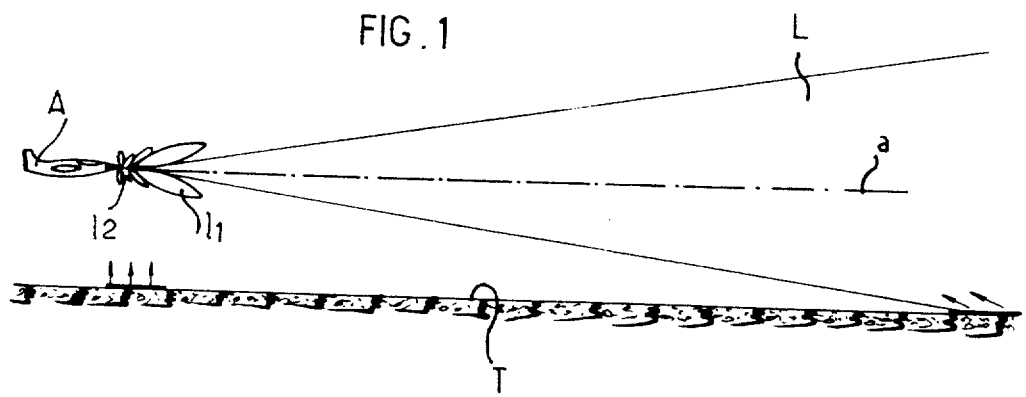
FIG. 1 is a diagram representing the radiation pattern of an airborne radar.

For an aircraft A equipped with a radar transmitter (FIG. 1), the radiation pattern comprises, as known, a main loge L, and secondary lobes $1_1$ at an angle with respect to the longitudinal axis $a$ of the aircraft, and also small or diffuse lobes $1_2$ which are more nearly perpendicular to axis $a$.

Figure 2:
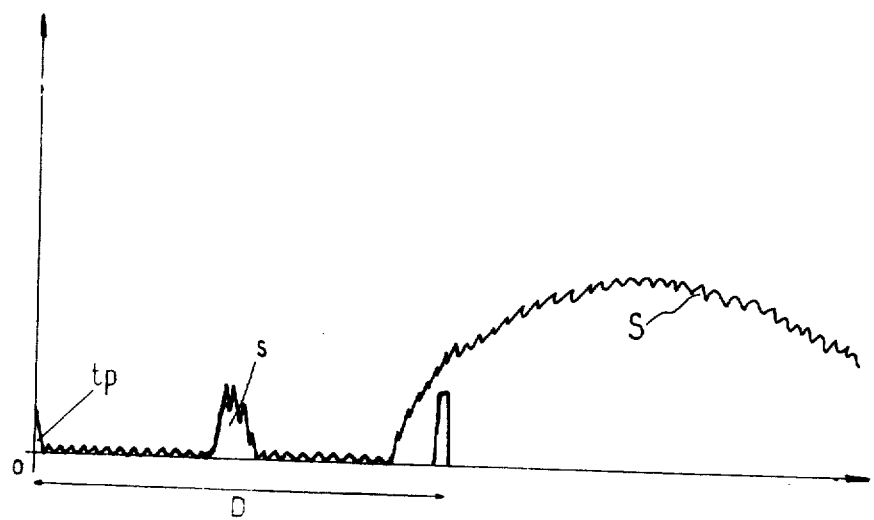
FIG. 2 is a graph of the target echoes.

FIG. 2 represents the spectral energy of the echos received by the radar receiver for an aircraft flying at low altitude above the ground T during a search phase starting from the distance O at which the transmit pulse is indicated by $tp$; the ground located straight below the aircraft provides an "altitude return signal" $s$ which may assume various forms according to the nature of the ground.

The quality of the aerial of the transmitter is supposed to be sufficiently good for the secondary lobes $1_1$ not to generate ground return echos. The ground echo S is that provided by the main lobe L of the radiation pattern which encounters the ground.

Figure 3:
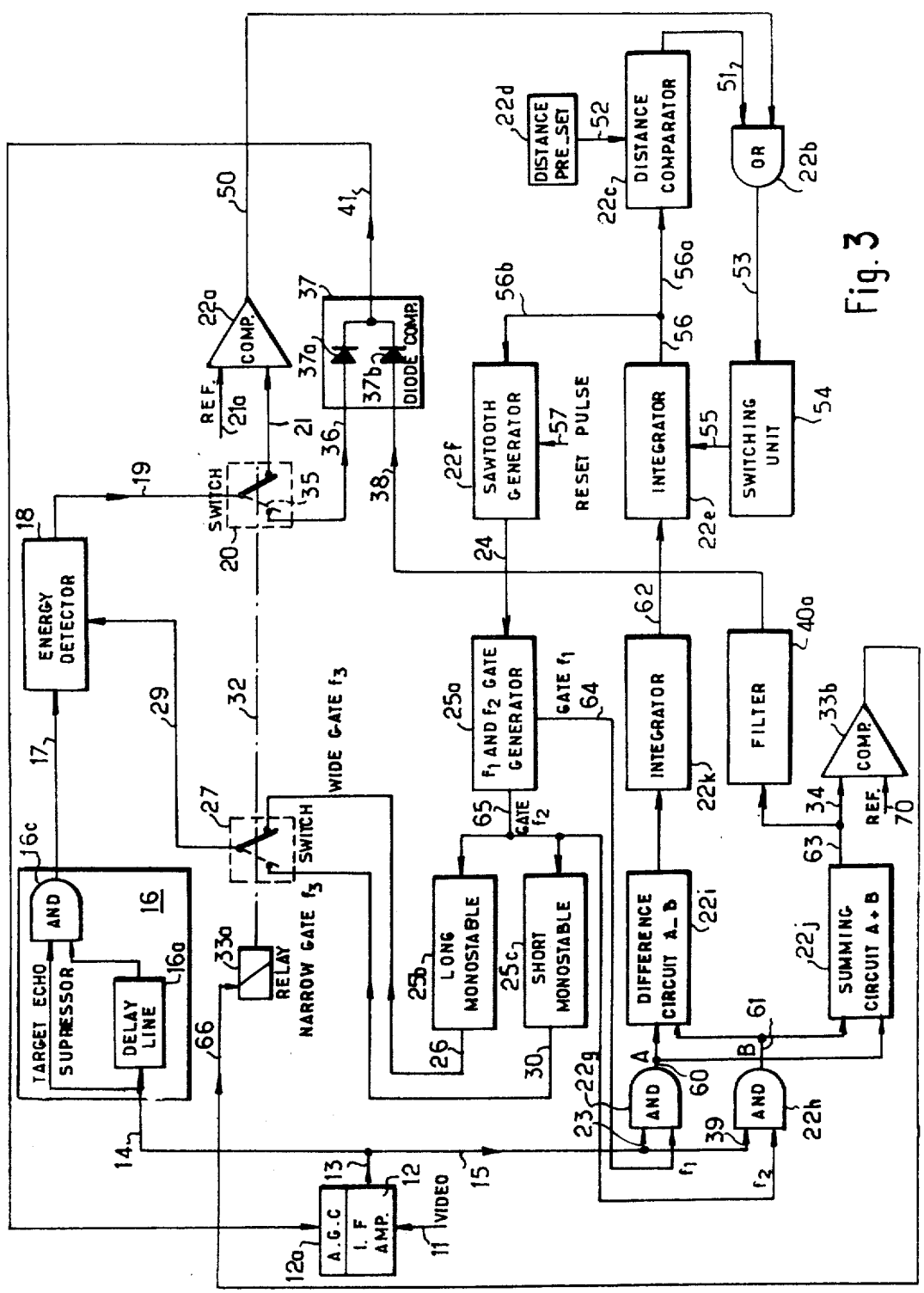
FIG. 3 is a detailed block diagram of the radar receiver according to this invention.

The video signal is applied to input 11, (FIG. 3) of an I.F. amplifier 12 comprising a conventional automatic gain control unit 12a. The output 13 of amplifier 12 is divided into two channel: a first channel 14 and a second channel 15 conveying the video frequency signals. The first channel 14 is connected to a device 16 intended to suppress a target echo and which comprises, in parallel, a delay line 16a adjusted according to the width of a target echo, depending on the width of the pulses emitted by the radar, a direct line 16b and also an AND gate 16c whose inputs are lines 16a and 16b and whose output is shown at 17.

The video frequency signal processed in unit 16 and thus free of any target echo is applied via line 17 to an energy detector and filtering unit 18 which is rendered operative, selectively, to let the video signal applied on line 17 proceed to its output 19 when pulses (to be described later on) are applied on its control input 29. The output 19 of unit 18 is connectable via a switch 20 to the input 21 of a unit 22 controlling search and tracking by conventional range gates $f_1$ and $f_2$ and including means to, when a voltage is present on input 21, discontinue the sweeping search towards the increasing ranges, return both gates $f_1$ and $f_2$ to the zero range point and then resume the sweeping of both range gates $f_1$ and $f_2$ between said zero distance and either a predetermined maximum distance or the distance D which corresponds to substantially the beginning of the ground return echo S and beyond which a target can no longer be acquired nor tracked without resorting to Doppler radar techniques not contemplated here.

Unit 22 comprises a comparator 22a, one input of which is conductor 21 and on the other input 21a of which is applied a reference voltage representing distance D, this reference voltage being of fixed value and taking into account the characteristics of the radar, of the aerial, etc.. Although the reference voltage is of fixed value, distance D is not constant since it is related to the points where the main lobe L of the radiation pattern meets the ground, and is thus a function of the altitude of the aircraft, its angle of dive, etc..

The output 50 of comparator 22a forms one input of an OR gate 22b whose other input 51 originates from a distance comparator 22c receiving on an input 52 a voltage representing the predetermined maximum distance preset by a device 22d, and which corresponds to the maximum sweeping range contemplated for acquisition of a target assuming that no ground return echo S would bar the radar from operating at such a distance.

The output of OR gate 22b is connected via a conductor 53 to a switching unit 54 which, through conductor 55, controls and initiates the operation of an integrator 22e providing on its output 56 a voltage representing the distance of the echo present on the video signal entering the IF amplifier 12. Output 56 branches into a conductor 56a applying the distance representing voltage onto comparator 22c and into a conductor 56b applying said same voltage to a sawtooth voltage generator 22f also controlled by the reset pulses applied on its second input 57.

Unit 22 also comprises two AND gates 22g, 22h common to unit 22 and to a device 40, to be described hereinafter, said gates having one of their inputs, 23, 39, connected to channel 15 and having their outputs 60, 61 both connected to a difference elaborating circuit 22i, part of unit 22 and to a summing circuit 22j also common to device 40. The output of circuit 22i is linked to an integrator 22k, part of unit 22, the output 62 of integrator 22k being the input of integrator 22e above described. The output of circuit 22j is linked via line 63 to a filter 40a, part of device 40 which is thus made of the two AND gates 22g, 22h, the circuit 22j and the filter 40a.

The video frequency signal issuing from amplifier 12 and which possibly contains a target echo, is applied by channel 15 to the AND gates 22g, 22h of device 22 whose sawtooth voltage generator 22f is connected by a line 24 to a pulse generator 25a providing on its outputs 64 and 65 the first range gate $f_1$ and the second range gate $f_2$. These two range gates are those which are conventional in tracking radars and their generation is not described here since it is similar to what is taught, among many other references, by "Skolnik's Radar Handbook, Mc Graw-Hill, 1970, Chapter 21, pages 21-40" or by the U.S. Pat. Nos. to YAMAUCHI (3,503,068) or to SCHONEBORN (3,648,286) where it is explained, inter alia, how the lagging edge of the pulse constituting range gate $f_1$ is used to generate gate $f_2$ adjacent to $f_1$.

Output 64 of generator 25a applies range gate $f_1$ onto the second input of the AND gate 22g, whereas output 65 similarly applies range gate $f_2$ onto the second input of AND gate 22h on the one hand, and also serves to generate a third range gate $f_3$ on the other hand. This third range gate $f_3$ is elaborated by means of two conventional monostable circuits 25b, 25c which with generator 25a form the unit 25 shown on FIG. 3. More specifically, circuit 25b generates a relatively large width gate $f_3$, whereas circuit 25c generates a small width gate $f_3$. A first output 26 of unit 25, connected to generator 25b, is adapted to selectively apply the large width range gate $f_3$ onto the control input 29 of unit 18, when a switch 27 is in the position represented by the full line 28, whereas a second output 30 of unit 25 connected to generator 25c supplies the narrower range gate $f_3$ to unit 18 when switch 27 is in the condition shown in broken line on FIG. 3.

Switch 27 and switch 20 are operated through a line 32 which constitutes the output of a switching control device 33 comprising a relay 33a whose output is line 32 and a comparator 33b the output 66 of which controls relay 33a and whose inputs are, on the one hand, an output 34 of the summing circuit 22j and, on the other hand, on a line 70, a voltage reference choosen as a function of the noise level of the receiver, comparator 33b being provided to control the switching of the acquisition operation mode of the radar to the tracking operation mode thereof.

When switch 20 is in the condition represented by broken line 35, the output 19 of unit 18 is connected by line 36 to a comparator 37, comprising for instance diodes 37a, 37b, the other input 38 of comparator 37 being the output of device 40a. The output of comparator 37 is connected via line 41 to the automatic gain control unit 12a.

Figure 4:
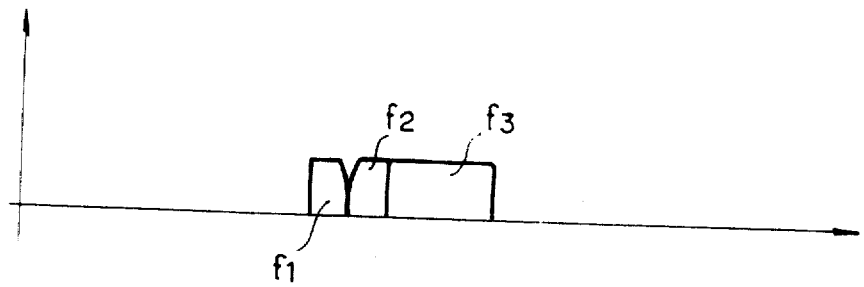
FIG. 4 is a graph of the range gates.

FIG. 4 represents the pattern of range gates supplied by the radar of the invention. Apart from the conventional range gates $f_1$ and $f_2$, it comprises a range gate $f_3$ which moves with range gates $f_1$ and $f_2$, and is adjacent to range gate $f_2$ since it is obtained from said gate $f_2$ just as gate $f_2$ is obtained from gate $f_1$.

Operation is as follows:

As long as the radar beam does not encounter obstacles, the search of a target is carried out in the conventional manner: the condition of switches 20 and 27 is that shown on full lines; the three range gates $f_1$, $f_2$ and $f_3$ are displaced in a sweeping motion from the theoretical zero distance to the maximum range preset by device 22D, then return to the theoretical zero distance, etc.. During this sweeping motion of search for a target, range gate $f_3$ has its larger width. Operation of the radar does not then however rely on said gate $f_3$ since it is governed by comparator 22c in the most conventional manner, unit 18 and comparator 22a being inoperative due to the absence of any echo whatsoever on line 17.

When a ground echo appears in the video signal entering amplifier 12, the energy corresponding to this ground echo is transmitted through line 17 to unit 18 which receives on its input 29 the large width range gate $f_3$. The output on line 19 then represents the energy level of the ground echo measured in gate $f_3$. If this energy level is low, as compared to the reference applied on line 21a of comparator 22a, then no output appears on line 50 and the radar is still controlled as above, by comparator 22c, i.e. the return to zero motion of range gates $f_1$ and $f_2$ is not influenced by the ground echo encountered and is governed only by the maximum preset distance introduced in comparator 22c.

If, on the contrary, the energy level measured in gate $f_3$ is important, greater than the reference applied on line 21a, then a signal appears on line 50, and through the OR gate 22b, renders operative switching unit 54. The latter resets integrator 22e to its initial state, and by line 56b the sawtooth generator 22f returns range gates $f_1$ and $f_2$ to the theoterical zero from where the target search is resumed by displacing said gates as above described.

If a target echo appears in the video signal entering amplifier 12, radar operation is as follows:

a. Signal A on output 60 of AND gate 22g and signal B on output 61 of AND gate 22h are added in the summing circuit 22j and the output of said circuit is compared in comparator 33b to the reference voltage applied on line 70, said reference voltage being such that when a target echo exists, a signal appears on line 66 which triggers relay 33a. The switches 20 and 27 are brought in the condition shown in dotted lines.

Simultaneously, circuit 22i elaborates the difference between signals A and B and from this difference signal A-B, by a conventional method, range gates $f_1$ and $f_2$ lock onto the target echo: the tracking operation mode begins. Due to device 16, the target echo does not reach unit 18, so that no voltage is applied to device 22 through line 19. As for (a) the radar has operated in an entirely conventional manner. However by switching switches 20 and 27 it is now the small width gate $f_3$ which is applied onto the control line 29 of unit 18 and this is taken advantage of to eliminate the ground echoes during the tracking operation mode, taking into account that a ground echo is of larger width than the target echo, in the following way:

b. In the tracking phase the gain control unit 12a of the I.F. amplifier 12 is controlled by a closed loop which includes line 13, line 15, branch 39, circuit 22j, unit 40a, comparator 37 and line 41. In the absence of ground echo, no voltage appears on line 19 and thus on input 36 of comparator 37, so that the signal on output 41 of comparator 37 maintains the gain of amplifier 12 and thus the video frequency signal at the level required for correct operation of the radar.

When the target echo approaches a ground echo during the tracking phase, the ground echo only reaches unit 18, since the target echo is suppressed in device 16, and the signal on output 19 is then representative of the energy of said ground echo as measured in gate $f_3$, of a small width since switch 27 is in the condition shown by broken line. Output 19 being connected to comparator 37 by switch 20, also in the condition shown in broken line, comparator 37 compares the energy of the echo measured in gate $f_3$ and the energy contained in range gates $f_1$ and $f_2$ since input 38 is fed from summing circuit 22j. Since, as already indicated, ground echoes are of larger width than target echoes, and since diode comparator 37 delivers on its output the largest of its input signals, it now delivers on line 41 a greater voltage than the previous one and the gain of amplifier 12 decreases. This results in a decrease of the voltage on input 34 of comparator 33b which delivers on its output 66 a signal resetting relay 33a in its former condition, and thus by means of switch 20, the radar is reset in its search condition.

In order to avoid the passage from the tracking mode to the search mode operation due to parasitic echoes, and also to be able to resume tracking as quickly as possible, thus on the point on which were locked the range gates $f_1$ and $f_2$, when the ground echo is of short duration, say less than 2 seconds, memory storage means cause search to resume only after a predetermined lapse of time, for instance 2 seconds, if at the end of this lapse of time the echo energy measured in narrow gate $f_3$ is still greater than that present in both gates $f_1$ and $f_2$.

What is claimed is:

1. An airborne target acquisition and range tracking radar receiver, comprising:
   an intermediate frequency amplifier, to the input of which return radar signals are applied;
   a gain control unit of said amplifier;
   echo suppressor means coupled to the output of said I.F. amplifier for suppressing a target echo from the return radar signal;
   energy detector means having one input coupled to the output of said suppressor means for detecting the energy of an echo return radar signal other than a target echo;
   range gate generating means generating first and second adjacent range gates as well as a third gate adjacent to one of said first and second gates and supplying said third gate to said detector means, said third gate having two possible widths of different magnitude;
   means for selectively coupling one of said two widths of said third gate to a second input of said detector means;
   first control means coupled to said automatic gain control unit for controlling the gain thereof;
   second control means;
   means coupling an output of said second control means to said range gate generating means for controlling the generation of said range gates; and
   further means selectively coupling the output of said energy detector means to inputs of said first and second control means for selectively controlling the gain of said automatic gain control unit and the generation of said range gates as a function of the output of said energy detector means;
   wherein said first control means includes means having inputs coupled to said further selective coupling means and to said range gate generating means and an output coupled to said gain control unit and providing at its output the signal of larger amplitude from between its two inputs, whereby the tracking of a target is discontinued when the energy in said third range gate is greater than that in said first and second range gates.

2. A radar receiver according to claim 1, further comprising means for connecting said second input of said energy detector to the output of said range-gate generator generating the third gate of smallest width when the two first range gates are locked onto a target after acquisition thereof.

3. A radar receiver according to claim 1, wherein the selective connection between said range-gate generator and said energy detector as well as the selective connection between the output of said energy detector and said gain control unit are controlled by switch control means connected to second comparator means having a first input representing the energy of an echo contained in said two first range gates and having a second input of preset value.

* * * * *